United States Patent
Uno

(10) Patent No.: US 10,843,609 B2
(45) Date of Patent: Nov. 24, 2020

(54) VEHICLE SEAT

(71) Applicant: TOYOTA BOSHOKU KABUSHIKI KAISHA, Aichi (JP)

(72) Inventor: Yosuke Uno, Aichi (JP)

(73) Assignee: TOYOTA BOSHOKU KABUSHIKI KAISHA, Aichi (JP)

( * ) Notice: Subject to any disclaimer, the term of this patent is extended or adjusted under 35 U.S.C. 154(b) by 0 days.

(21) Appl. No.: 15/983,538

(22) Filed: May 18, 2018

(65) Prior Publication Data

US 2018/0339625 A1 Nov. 29, 2018

(30) Foreign Application Priority Data

May 23, 2017 (JP) ................................. 2017-101724
Mar. 15, 2018 (JP) ................................. 2018-047797

(51) Int. Cl.
| | |
|---|---|
| *B60N 2/90* | (2018.01) |
| *A47G 9/10* | (2006.01) |
| *A47C 27/08* | (2006.01) |
| *A47G 9/00* | (2006.01) |

(52) U.S. Cl.
CPC ............ *B60N 2/90* (2018.02); *A47G 9/1027* (2013.01); *B60N 2/914* (2018.02); *B60N 2/976* (2018.02); *A47C 27/082* (2013.01); *A47G 2009/003* (2013.01)

(58) Field of Classification Search
CPC .. A47G 2009/003; B60N 2/42; A47C 27/082; A44B 11/2515
See application file for complete search history.

(56) References Cited

U.S. PATENT DOCUMENTS

| | | | | |
|---|---|---|---|---|
| 5,330,255 | A * | 7/1994 | Stawicki ................ | A47C 7/383 297/391 |
| 5,975,637 | A * | 11/1999 | Geuss ..................... | B60N 2/002 297/391 |
| 10,104,967 | B2 * | 10/2018 | Wang ........................ | A47C 4/54 |
| 2006/0137099 | A1 * | 6/2006 | Feher ....................... | A47C 7/74 5/713 |
| 2015/0061331 | A1 * | 3/2015 | Yang ....................... | A47C 7/744 297/180.14 |
| 2015/0265055 | A1 | 9/2015 | Wang et al. | |
| 2017/0043741 | A1 * | 2/2017 | Kobayashi ............... | B60N 2/42 |
| 2017/0291473 | A1 * | 10/2017 | Kim ................... | B60H 1/00485 |
| 2017/0291567 | A1 * | 10/2017 | Koike ................... | B60R 21/207 |

(Continued)

FOREIGN PATENT DOCUMENTS

| | | | |
|---|---|---|---|
| CN | 104000418 A | 8/2014 | |
| EP | 0788941 A2 * | 8/1997 | ............... B60N 2/42 |
| JP | 2003-144266 | 5/2003 | |

OTHER PUBLICATIONS

Chinese Office Action in the counterpart Chinese patent application No. 201810494726.3, dated May 20, 2020 (and a machine-generated English translation thereof).

*Primary Examiner* — Timothy J Brindley
(74) *Attorney, Agent, or Firm* — Greenblum & Bernstein, P.L.C.

(57) ABSTRACT

Provided is an example of a vehicle seat that allows easy use of external pneumatic equipment such as an external air pillow. The vehicle seat includes an output portion configured to output an air having a pressure equal to or higher than an atmospheric pressure to an outside of the vehicle seat.

11 Claims, 11 Drawing Sheets

(56) References Cited

U.S. PATENT DOCUMENTS

2018/0065516 A1\*   3/2018   Ogiso ..................... A47C 7/40
2018/0134189 A1\*   5/2018   Iwasaki ................. B60N 2/885
2018/0339626 A1\*  11/2018   Kojima ................. B60N 2/914

\* cited by examiner

VEHICLE SEAT

CROSS-REFERENCE TO RELATED APPLICATIONS

This application claims the benefit of Japanese Patent Application No. 2017-101724 filed on May 23, 2017 and No. 2018-47797 filed on Mar. 15, 2018 with the Japan Patent Office, the entire disclosures of which are incorporated herein by reference.

BACKGROUND

The present disclosure relates to a vehicle seat to be mounted on a vehicle.

For example, a relaxing pillow for driver disclosed in Japanese Unexamined Patent Application Publication No. 2003-144266 requires an inside of the pillow to be filled with an air compressed to a pressure equal to or higher than an atmospheric pressure.

SUMMARY

In order to use the relaxing pillow for driver disclosed in the above-mentioned publication, it becomes necessary for a vehicle to be provided with an air pump for filling an inside of the pillow with the air compressed (hereinafter, compressed air) to a pressure equal to or higher than the atmospheric pressure. However, it is highly probable that a common vehicle such as an automobile is not equipped with the air pump.

Thus, it is difficult to use an equipment which requires compressed air (hereinafter, pneumatic equipment) such as the relaxing pillow for driver. The present disclosure discloses an example of a vehicle seat which allows easy use of a pneumatic equipment.

One aspect of the present disclosure provides a vehicle seat to be mounted on a vehicle. The vehicle seat includes an output portion configured to output an air having a pressure equal to or higher than an atmospheric pressure to an outside of the vehicle seat. Thereby, an occupant who uses the vehicle seat can easily use the pneumatic equipment.

The vehicle seat may be configured as follows.

The vehicle seat may include an air pump that supplies compressed air, and an air bag that expands in receipt of the compressed air supplied from the air pump. The air pump may supply the compressed air to the output portion. In this way, it is no longer necessary to include a component for receiving the compressed air from an equipment other than the vehicle seat.

The vehicle seat may include a retaining mechanism for retaining a coupling member coupled to the output portion. The retaining mechanism may be configured to detach the coupling member from the output portion, when a force beyond a specified magnitude is applied.

In this way, when a force beyond the specified magnitude is applied to the pneumatic equipment, the coupling member can be detached from the output portion.

The coupling member may include a fitting portion. The output portion may be provided at least at an upper end of a seatback, and the fitting portion of the coupling member may be detachably fitted to the output portion. The fitting portion may be configured to be detachable from the output portion, when a force including a component toward a seat front side is applied to the fitting portion.

In this way, when the force including the component toward the seat front side is applied to the pneumatic equipment, the coupling member can be detached from the output portion.

The output portion may be provided at an end in a seat-width axis of the upper end of the seatback.

BRIEF DESCRIPTION OF THE DRAWINGS

An example embodiment of the present disclosure will be described hereinafter with reference to the accompanying drawings, in which.

DETAILED DESCRIPTION OF THE PREFERRED EMBODIMENTS

Figure 1:
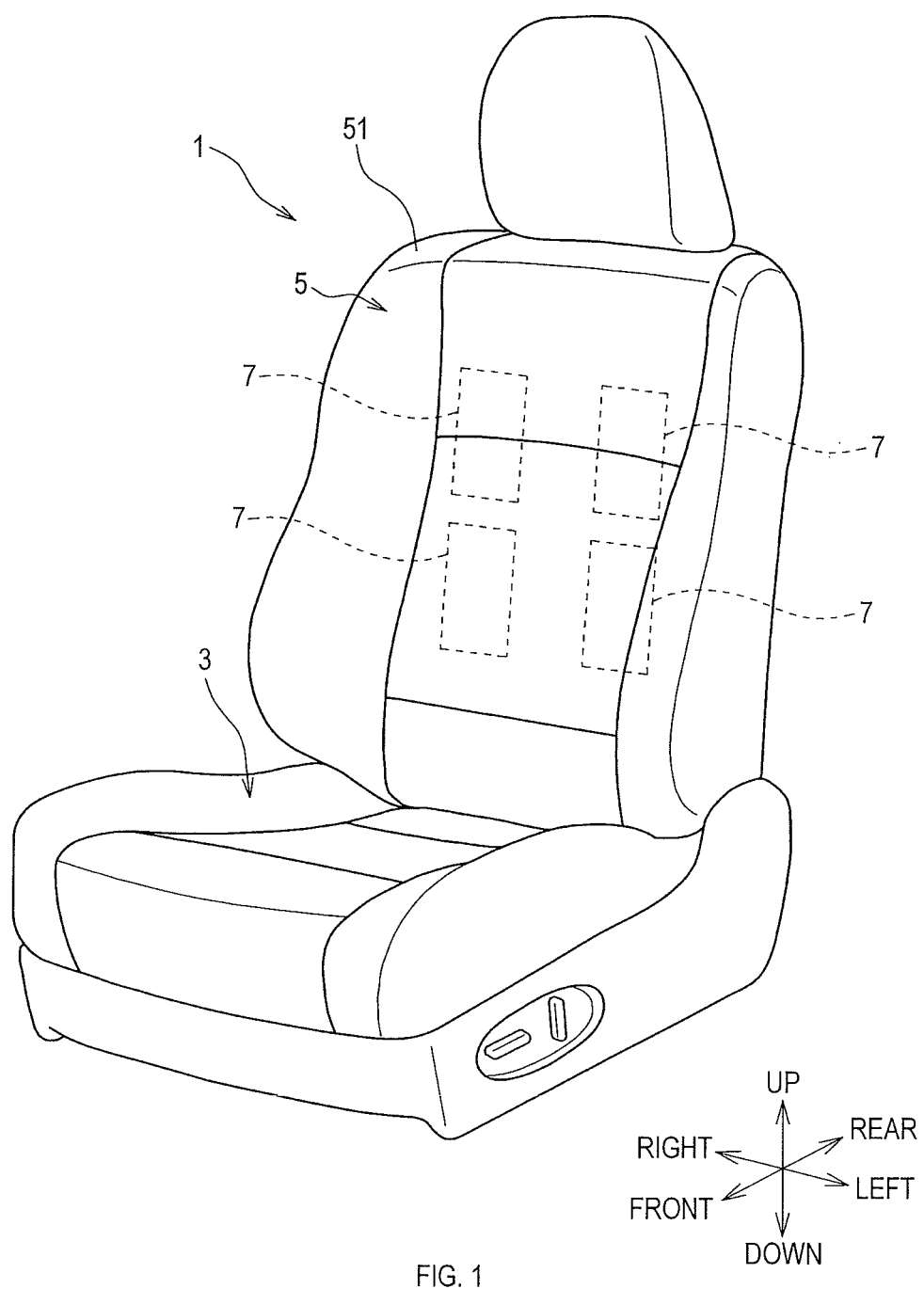
FIG. 1 shows a vehicle seat according to a first embodiment.

An "embodiment" described below shows an example embodiment within the technical scope of the present disclosure. In other word, matters specifying the invention described in the claims are not limited to the specific configuration, structure, etc. shown in the embodiment below.

Arrows and the like indicating directions attached to respective figures are provided to make it easy to understand the relationship between the respective figures. Arrows and the like (directions) attached to the respective figures do not limit the scope of the present disclosure.

At least one member or portion is provided for a member or portion at least described with a reference numeral, except when that member or portion is explicitly described as "one member" or the like. In other words, two or more such members may be provided if there is no mention of "one member" or the like. The "occupant" in the present application refers to a vehicle occupant or a user of a vehicle seat.

First Embodiment

1. Outline of Vehicle Seat

The present embodiment provides a vehicle seat. A vehicle seat 1, as shown in FIG. 1, has a seat cushion 3 and a seatback 5. The seat cushion 3 supports the bottoms of an occupant. The seatback 5 supports the back of the occupant.

In at least one of the seat cushion 3 and the seatback 5, at least one air bag (bladder) 7 (multiple air bags 7, in the present embodiment) is buried for locally applying pressure to the body of the occupant. The term "air bag" in this specification does not specifically refer to conventional "safety air bags" designed to inflate by chemical reaction (a chemical explosion) for safety purposes, such as an air bag in the steering wheel. However, the "air bag" of this specification may be inflated for safety, for example during a collision, or a roll over, or activation of automatic braking, or detection of skidding, or detection of locked brakes, etc. Further, the air bag of this specification may be combined with a chemical reaction for extremely rapid inflation, or with a very high pressure tank for extremely rapid inflation. In other words, safety is not the primary purpose in some embodiments, but may be the primary purpose in other embodiments.

The multiple air bags 7 expand toward the skin (the body of the occupant) when an air compressed (hereinafter, compressed air) to a pressure equal to or higher than an atmospheric pressure is filled in. The air bags 7 implement a massage (acupressure) function for applying pressure to the body of the occupant.

Figure 2:
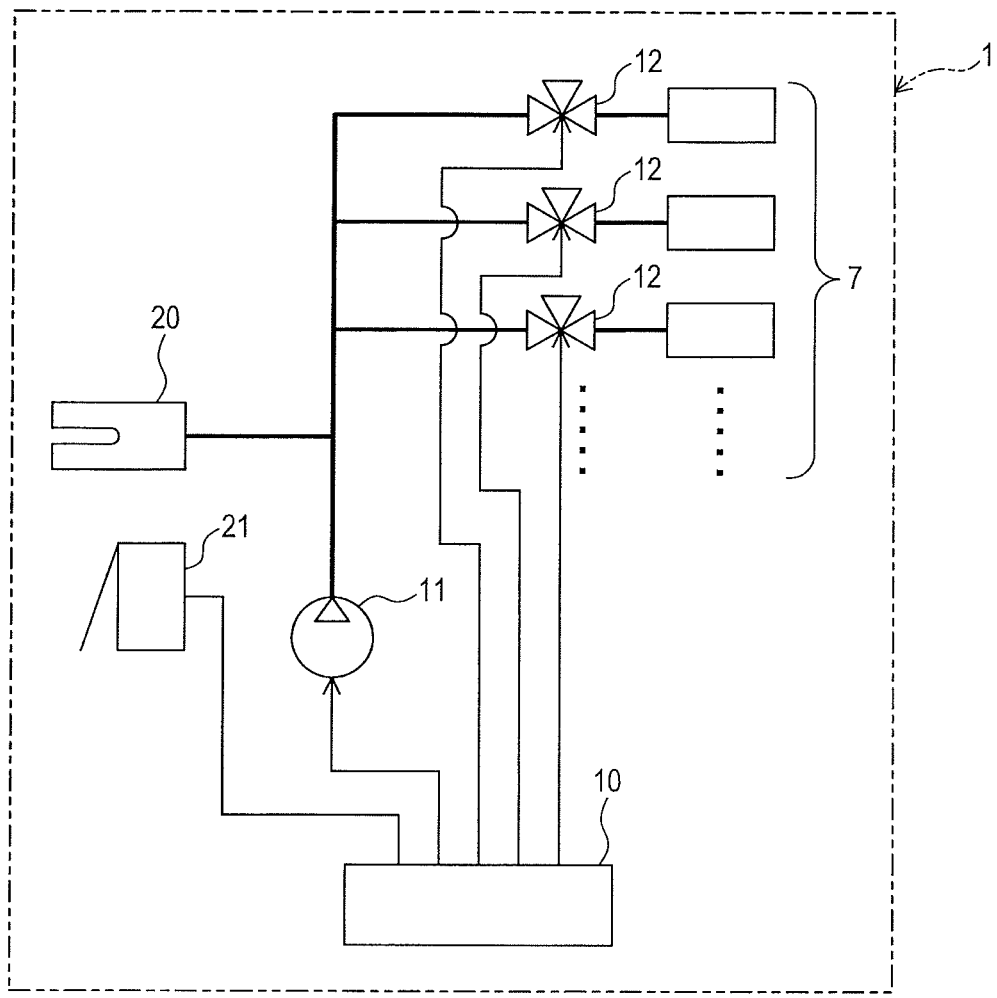
FIG. 2 shows a supply circuit of compressed air in the first embodiment.

Supply control of the compressed air to each air bag 7 and discharge control of the compressed air from each air bag 7 are performed by the air pump 11 and at least one valve 12, as shown in FIG. 2. The valve 12 opens and closes an inlet and an outlet of air provided in the air bag 7. In the present embodiment, the same number of valves 12 as the air bags 7 are provided.

Each valve 12 according to the present embodiment is preferably an electromagnetic three-way valve. Each valve 12 selectively switches a state of the air bag 7 to one of a state in which the air pump 11 is in communication with the air bag 7 (a charging state), a state in which the air bag 7 is in communication with the atmosphere (a venting state), and a state in which the inlet and the outlet are closed (a closed state).

The air pump 11 generates compressed air. Operation of the air pump 11 and each valve 12 is controlled by a controller 10. That is, when expanding the air bag 7, the controller 10, operates the air pump 11 and brings the air bag 7 into communication with the air pump 11 (charging state). When contracting the air bag 7, the controller 10 brings the air bag 7 into communication with the atmosphere (venting state).

The controller 10 is configured by a microcomputer including a CPU, a ROM and a RAM. A program for controlling the operation of the air pump 11 and each valve 12 is prestored in a nonvolatile storage such as a ROM.

2. External Output of Compressed Air

The vehicle seat 1, as shown in FIG. 2, includes an output portion 20 that can output compressed air to an outside of the vehicle seat 1. "Can output compressed air to an outside" means that compressed air can be output to a pneumatic equipment other than a pneumatic equipment provided in advance in the vehicle seat 1 (for example, the air bag 7).

The output portion 20 is provided in any part of the vehicle seat 1 (including an inside of the vehicle seat 1). The output portion 20 according to the present embodiment is provided at an end 51 in a seat-width axis of an upper end of the seatback 5 (at a so-called shoulder of the seatback).

The end 51 may be a portion where a buckle (not shown) of a seat belt (not shown) is provided. The portion where a buckle is provided is, for example, a right side portion in the seat-width axis, in a vehicle seat mounted on a vehicle left side.

The controller 10 operates the air pump 11 when an external output switch 21 is turned on. As a result, compressed air is output from the output portion 20 to the outside. The external output switch 21 according to the present embodiment is buried in the vehicle seat 1 and is not exposed to the outside.

Figure 3:
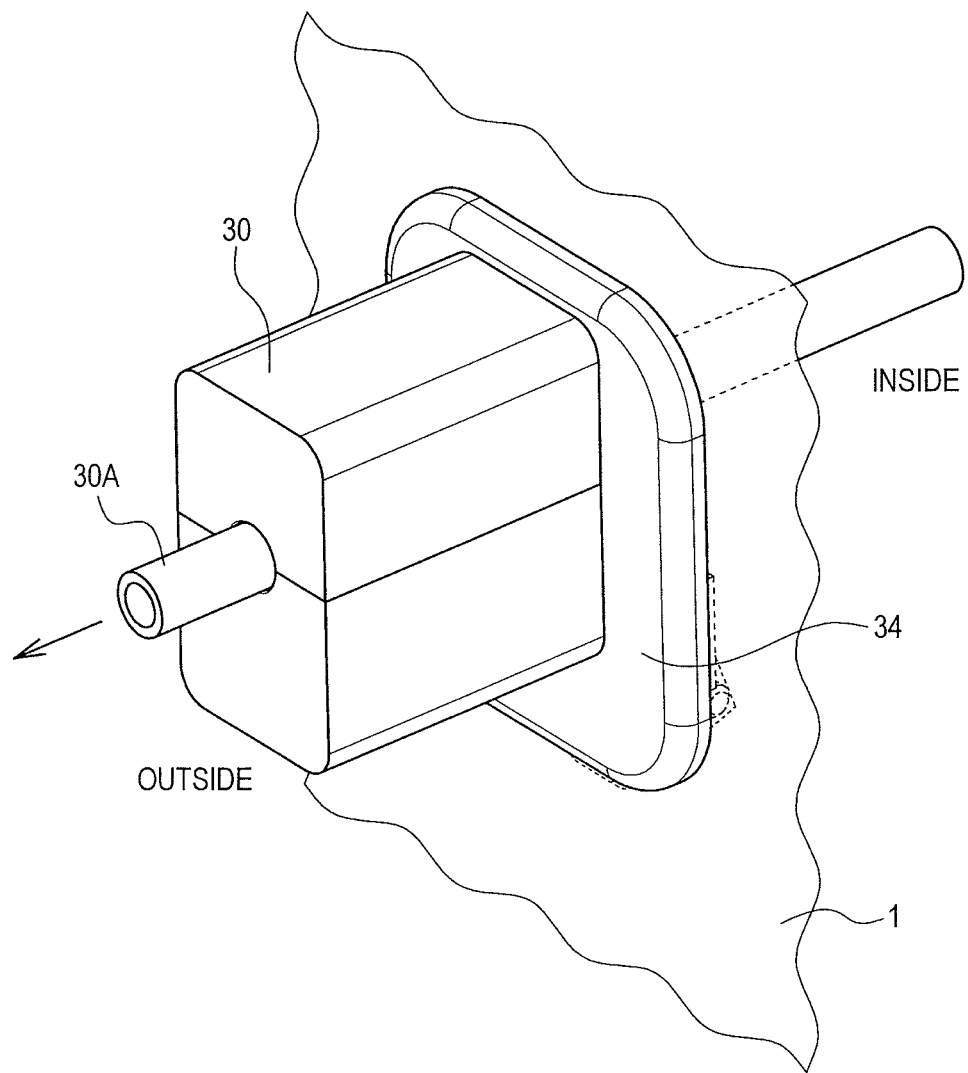
FIG. 3 shows a state in which a coupling member according to the first embodiment is coupled.

In the present embodiment, when the output portion 20 is coupled to a pneumatic equipment (for example, an air pillow) via a coupling member 30 (see FIG. 3), the external output switch 21 is turned on.

2. 2 Configuration of Coupling Member

Figure 4:
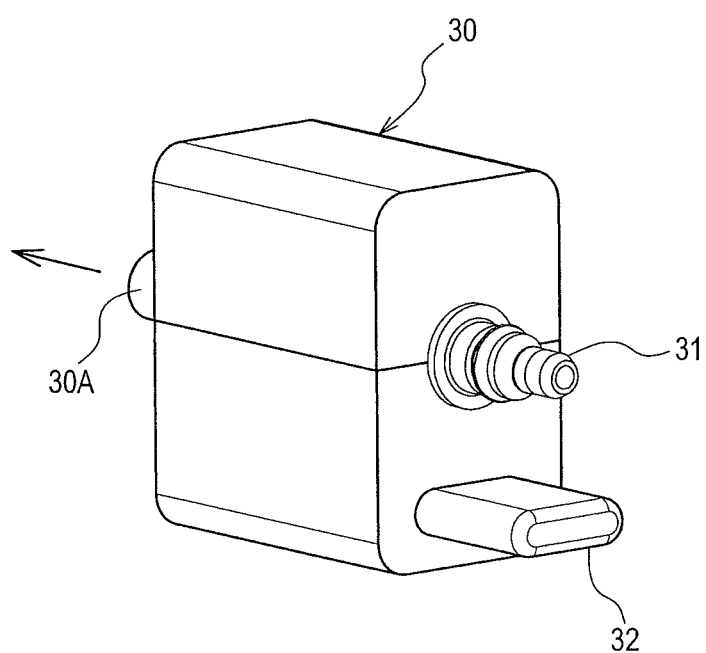
FIG. 4 shows the coupling member according to the first embodiment.
Figure 5:
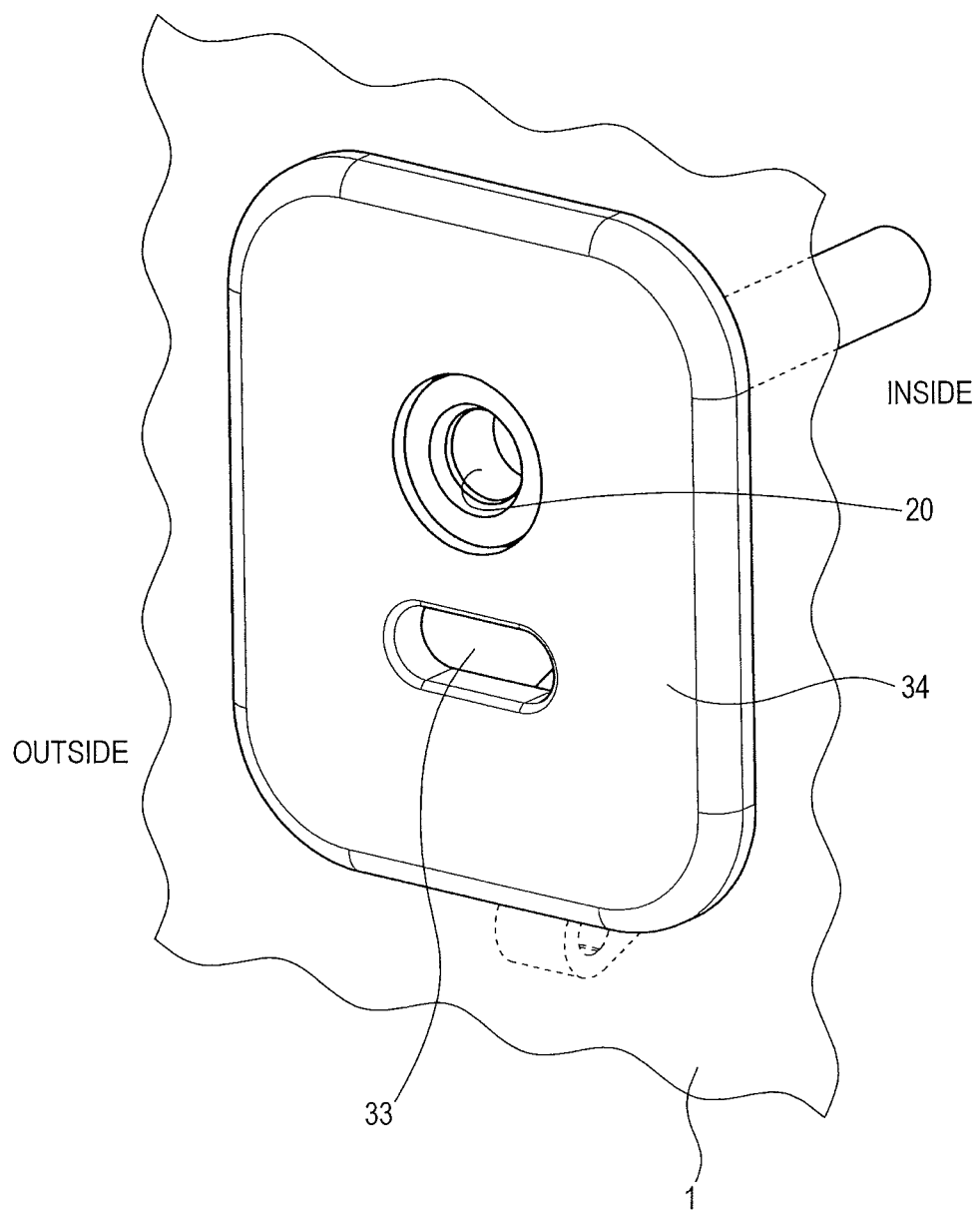
FIG. 5 shows a state in which the coupling member according to the first embodiment is coupled.

The coupling member 30, as shown in FIG. 4, includes a male joint 31 and a switch pressing portion 32. The coupling member 30 also includes a discharge opening 30A for discharging air. The male joint 31 is an example of a fitting portion of the present disclosure. The male joint 31 is a tubular member that can be fitted to the output portion 20. The switch pressing portion 32 is a protrusion that can be fitted to a switch hole 33 shown in FIG. 5.

Figure 6:
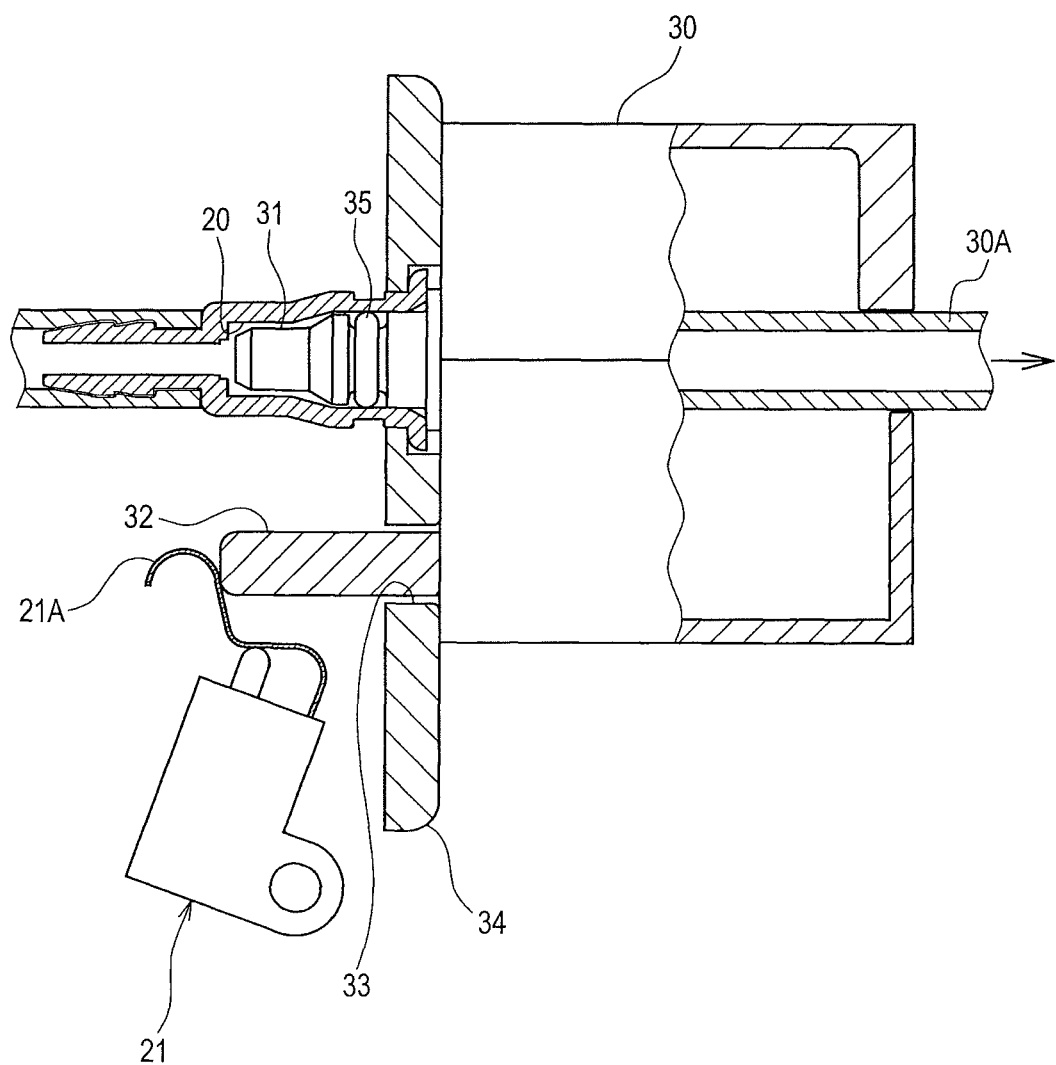
FIG. 6 is a cross-sectional view showing a state in which the coupling member according to the first embodiment is coupled.

The switch hole 33 is provided at a position near an outlet of the compressed air which forms the output portion 20. Inside the switch hole 33, that is, inside the vehicle seat 1, the external output switch 21 is arranged as shown in FIG. 6.

Thus, when the switch pressing portion 32 is inserted to the switch hole, the switch pressing portion 32 is brought into contact with a movable part 21A of the external output switch 21. As a result, the external output switch 21 is turned on.

In the present embodiment, a permanent magnet (not shown) is buried in at least one of: (i) a plate 34 (see FIG. 6) provided with the switch hole 33 and the output portion 20 (outlet); and (ii) the coupling member 30. The permanent magnet sucks the other of (i) and (ii). A magnetic member (not shown) made of ferromagnetic material, such as iron, is buried in the other of (i) and (ii).

A packing made of rubber (for example, an O-ring made of nitrile rubber) 35 is attached to an inner peripheral surface of the output portion 20 (outlet) or an outer surface of the male joint 31. The packing 35 is an example of a sealing member for sealing leakage of compressed air.

In the present embodiment, a retaining mechanism includes the permanent magnet, the magnetic member, and the packing 35. The retaining mechanism maintains a state in which the coupling member 30 is coupled to the output portion 20. That is, an attraction force generated between the permanent magnet and the magnetic member, and a friction force generated at a contact portion between the packing 35 and the male joint 31, become a retaining force for retaining the coupling state. Mechanical mating/retaining mechanisms may also be used.

The retaining mechanism is configured such that the coupling member 30 can be detached from the output portion 20 when a force beyond a specified magnitude that causes the coupling member 30 to be detached from the output portion 20 (hereinafter, a detachment force) is applied. That is, the retaining mechanism has a specified magnitude of retaining force.

3. Characteristics of Vehicle Seat According to Present Embodiment

The vehicle seat 1 includes the output portion 20 that can output compressed air. As a result, the occupant who uses the vehicle seat 1 can easily use a pneumatic equipment such as an air pillow.

The vehicle seat 1 includes the air pump 11 that can supply compressed air to the output portion 20. As a result, no component is necessary for receiving supply of compressed air from an equipment other than the vehicle seat 1.

The retaining mechanism is configured such that the coupling member 30 can be detached from the output portion 20 when the detachment force is applied. As a result, when a force beyond the specified magnitude is applied to the pneumatic equipment, the coupling member 30 can be detached from the output portion 20.

Therefore, when, for example, a relaxing pillow (not shown) for driver is used as the external pneumatic equipment, and when an inertia force toward a seat front side is applied to the vehicle seat 1 and a force beyond the detachment force is applied to the coupling member 30, the relaxing pillow for driver is detached from the output portion 20.

Second Embodiment

Figure 7:
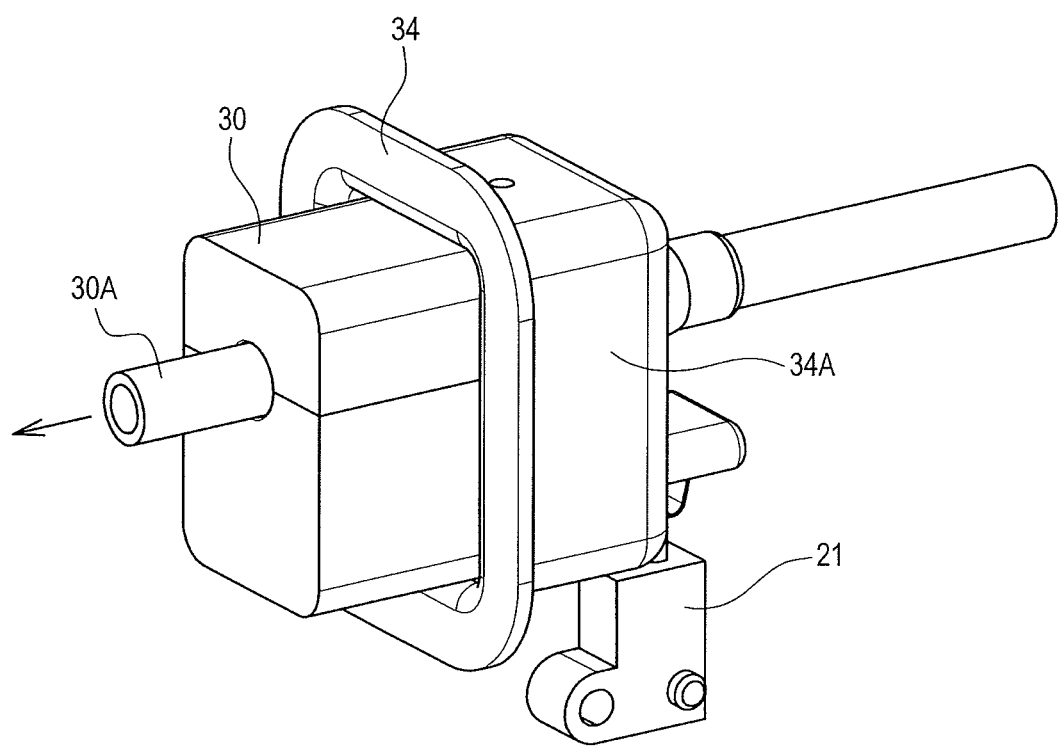
FIG. 7 shows a state in which a coupling member according to a second embodiment is coupled.

In FIG. 7, a recess 34A into which a part of the coupling member 30 can be fitted is provided in the plate 34. The same constituent features or the like as those in the above-described embodiment are denoted by the same reference signs as those in the above-described embodiment. Thus, the overlapping description will not be repeated.

Third Embodiment

Figure 8:
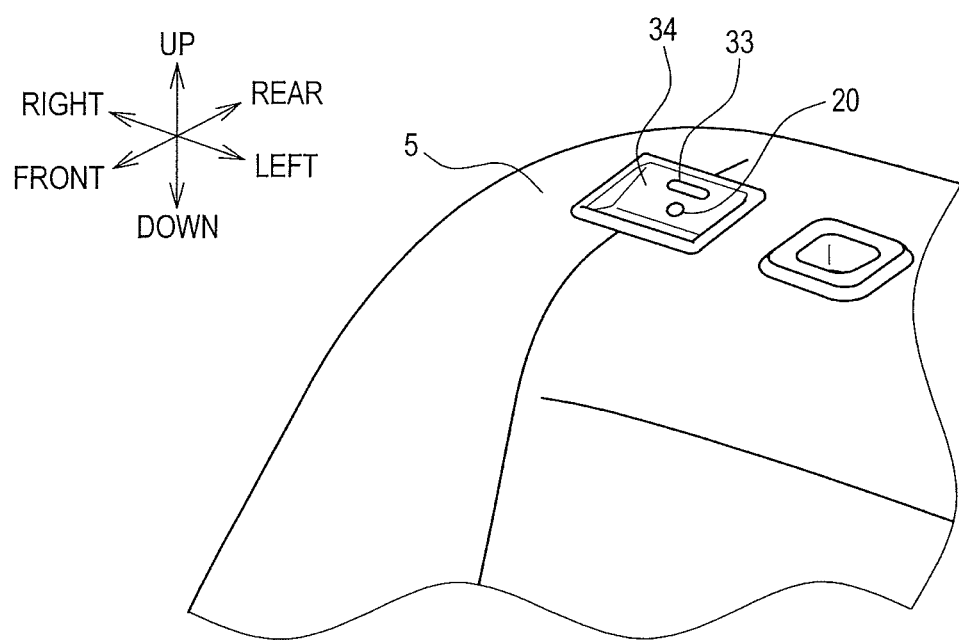
FIG. 8 shows an output portion according to a third embodiment.

In FIG. 8, the plate 34 is tilted with respect to an up-down direction and faces the seat front side to an extent that, when the plate 34 is projected on a virtual surface orthogonal to a seat front-rear direction, the fitting hole forming the output portion 20 can exist on the virtual surface.

In other words, the plate 34 faces the seat front side so that a central axis of the fitting hole which forms the output portion 20 is tilted slightly forward with respect to the up-down direction. That is, the occupant can view the fitting hole forming the output portion 20 from the seat front side.

The male joint 31 is detachable from the output portion 20 when a force containing a component toward the seat front side is applied to the male joint 31.

As a result, when the force containing the component toward the seat front side is applied to the pneumatic equipment such as the relaxing pillow for driver, the coupling member 30 can be reliably detached from the output portion 20.

Fourth Embodiment

Figure 9:
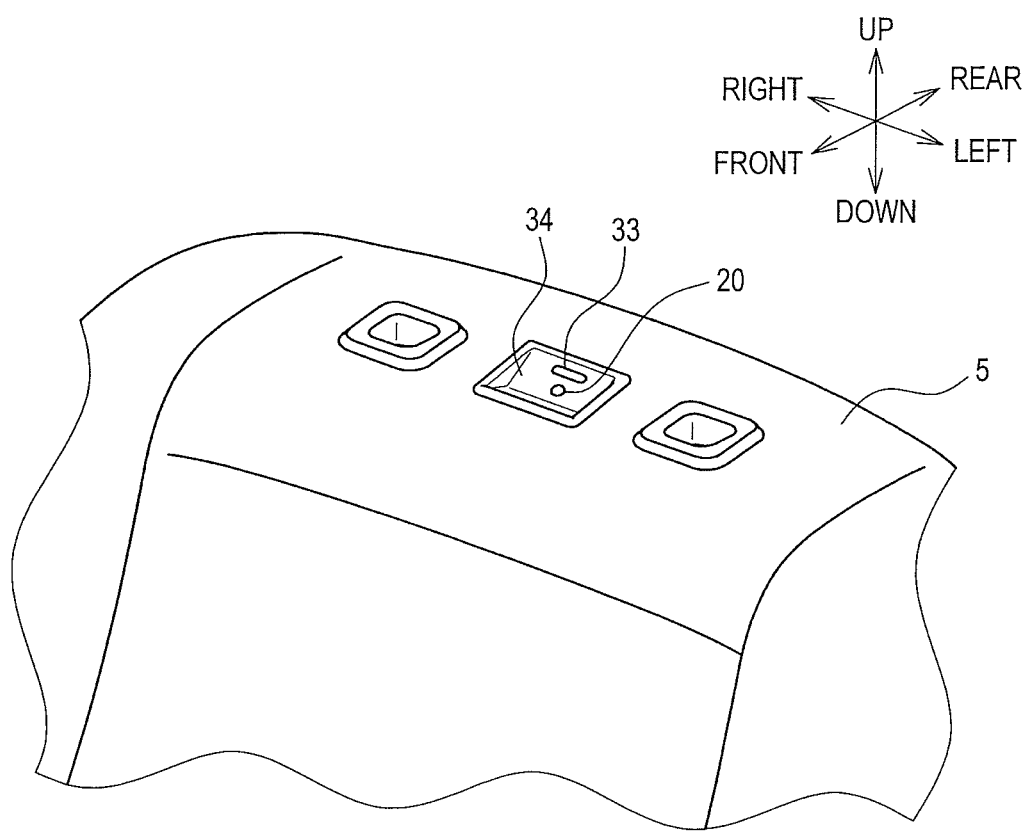
FIG. 9 shows the output portion according to a fourth embodiment.

FIG. 9 is similar to FIG. 8, except that the plate 34 is positioned centrally in the seatback 5, and not near a side of the seatback. The output portion 20 according to the present embodiment, as shown in FIG. 9, is provided at the upper end of the seatback 5. In the present embodiment as well, the plate 34 faces the seat front side so that the central axis of the fitting hole forming the output portion 20 is tilted with respect to the up-down direction.

Fifth Embodiment

Figure 10:
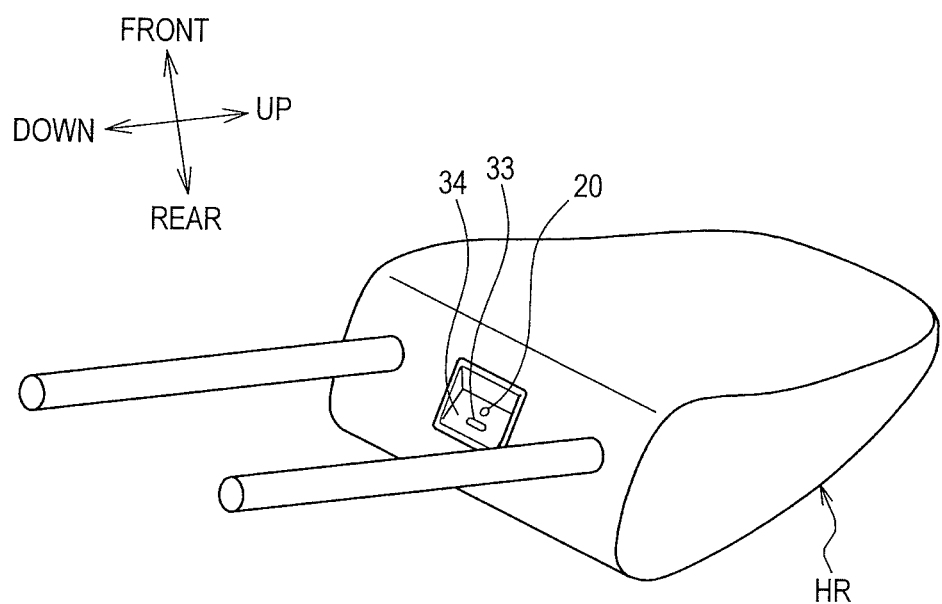
FIG. 10 shows the output portion according to a fifth embodiment.

In FIG. 10, the output portion 20 is provided on a bottom surface of the headrest HR. In the present embodiment as well, the plate 34 faces the seat front side so that the central axis of the fitting hole forming the output portion 20 is tilted with respect to the up-down direction.

Sixth Embodiment

Figure 11:
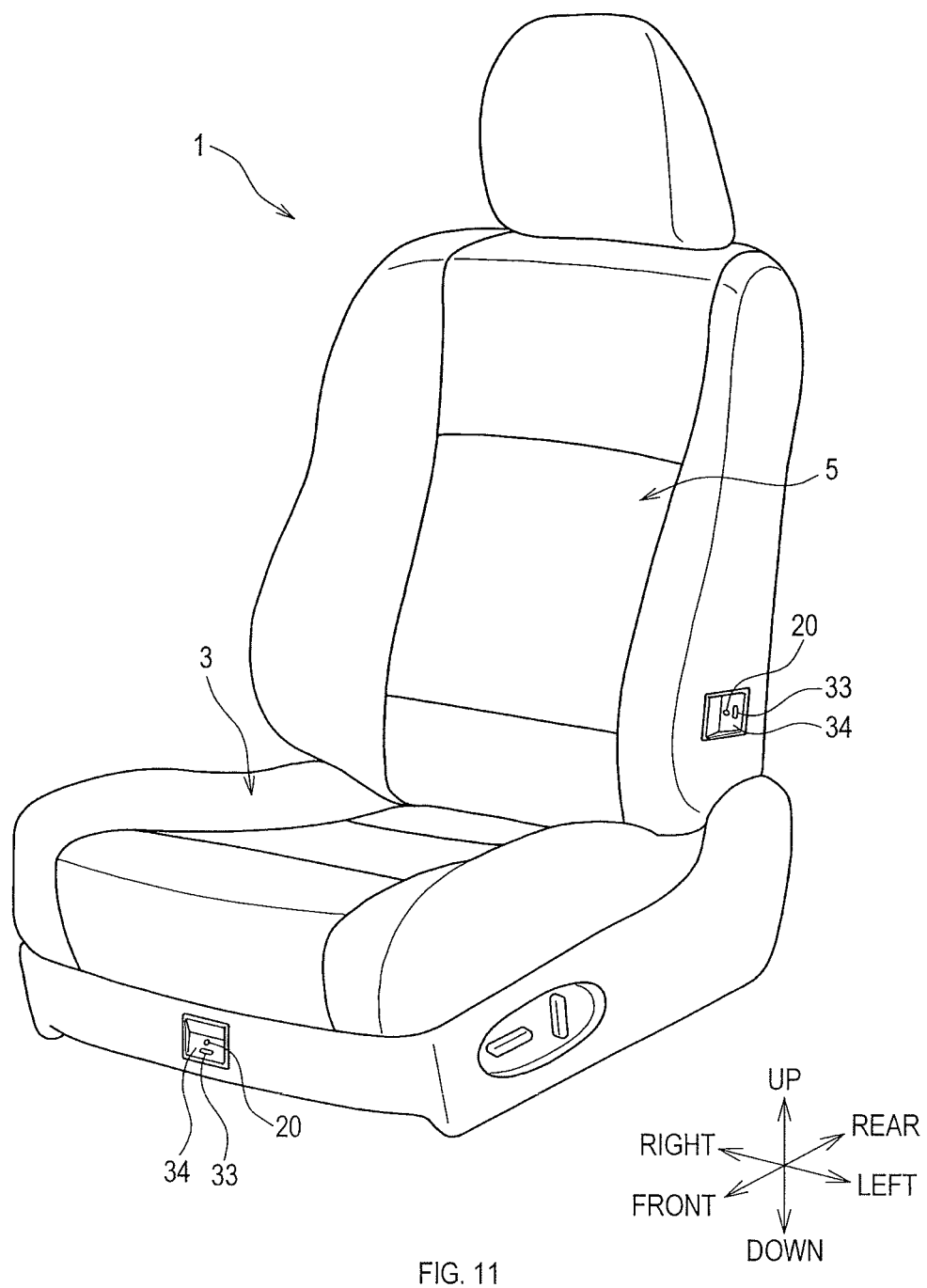
FIG. 11 shows the output portion according to a sixth embodiment.

In FIG. 11, a first output portion 20 is provided on a side surface of the seatback 5, and a second output portion 20 is provided on a front end surface of the seat cushion 3.

Other Embodiments

For example, the external output switch 21 may be eliminated, and an accumulator tank which stores compressed air and a check valve which opens when the coupling member 30 is coupled to the output portion 20 may be provided. As a result, when the coupling member 30 is coupled to the output portion 20, the check valve opens and compressed air is supplied from the accumulator tank to a pneumatic equipment.

It is preferable that the above-described accumulator tank is maintained by the controller 10 such that compressed air equal to or higher than a specified pressure is accumulated at all time. The accumulator tank and the air pump 11 may be provided either inside the vehicle seat 1 or outside the vehicle seat 1.

Also, for example, the vehicle seat 1 may be configured such that (a) the air pump 11 starts to operate when the coupling member 30 is coupled to the output portion 20 and stops when a specified time elapses after the start of the air pump 11, or (b) the air pump 11 stops when a discharge pressure of the air pump 11 is beyond a specified discharge pressure.

For example, the air bag 7 may implement a support function for retaining a seated posture of the occupant.

For example, the retaining mechanism may be configured by an elastic locking structure such as snap fit.

The vehicle seat 1 can be also applied to a seat for use in a vehicle such as railway vehicles, ships, and aircrafts, as well as to a stationary type seat for use such as in theatres and at home.

Furthermore, the present disclosure is not limited to the above-described embodiments as long as the present disclosure meets the gist of the invention recited in the claims. Thus, the particular configuration of the coupling member 30, the position of the output portion 20 and the like are not limited to those of the above-described embodiments. It is a matter of course that at least two embodiments among the plurality of embodiments described above may be combined.

What is claimed is:

1. A vehicle seat to be mounted on a vehicle, the vehicle seat comprising:
   an output portion configured to output an air having a pressure equal to or higher than an atmospheric pressure to an outside of the vehicle seat, wherein:
   the output portion has a discharge opening for compressed air and a connecting hole,
   the discharge opening is configured so that a fitting portion of a coupling member coupled to the output portion is detachably fitted thereto,
   the connecting hole is configured so that a protrusion different from the fitting portion of the coupling member is fitted thereto,
   a fitting direction of the fitting portion to the discharge opening and a fitting direction of the protrusion to the connecting hole are parallel to each other, and
   the protrusion penetrates the output portion through the connecting hole.

2. The vehicle seat according to claim 1, further comprising:

an air pump that supplies compressed air; and an air bag that expands in receipt of the compressed air supplied from the air pump, wherein the air pump is configured to supply the compressed air to the output portion.

3. The vehicle seat according to claim 1, further comprising:

a retaining mechanism for retaining the coupling member coupled to the output portion, wherein the retaining mechanism is configured to detach the coupling member from the output portion, when a force beyond a specified magnitude is applied.

4. The vehicle seat according to claim 3, wherein the output portion is provided at least at an upper end of a seatback, and the fitting portion is configured to be detachable from the output portion when a force including a component toward a seat front side is applied to the fitting portion.

5. The vehicle seat according to claim 4, wherein the output portion is provided at an end in a seat-width axis of the upper end of the seatback.

6. The vehicle seat according to claim 3, wherein the retaining mechanism retains the coupling member by a magnetic force.

7. The vehicle seat according to claim 1, further comprising:

an air pump that supplies the compressed air to the output portion; and an external output switch for operating the air pump when the coupling member is coupled to the output portion.

8. The vehicle seat according to claim 7, wherein the protrusion operates the external output switch when the fitting portion is fitted to the discharge opening.

9. The vehicle seat according to claim 1, further comprising an air pump that supplies the compressed air to the output portion; and an external output switch for operating the air pump, wherein the external output switch is disposed inside the connecting hole.

10. The vehicle seat according to claim 1, wherein the discharge opening is positioned outside the connecting hole when viewed from the fitting direction of the fitting portion to the discharge opening.

11. The vehicle seat according to claim 1, wherein the coupling member is detached from the output portion when a force beyond a specified magnitude is applied to the output portion by an inertia force toward a seat front side.

* * * * *